Sept. 18, 1934.  J. M. F. SOELBERG  1,974,125
PROCESS FOR GENERATING GASEOUS FUELS
Filed Jan. 12, 1931
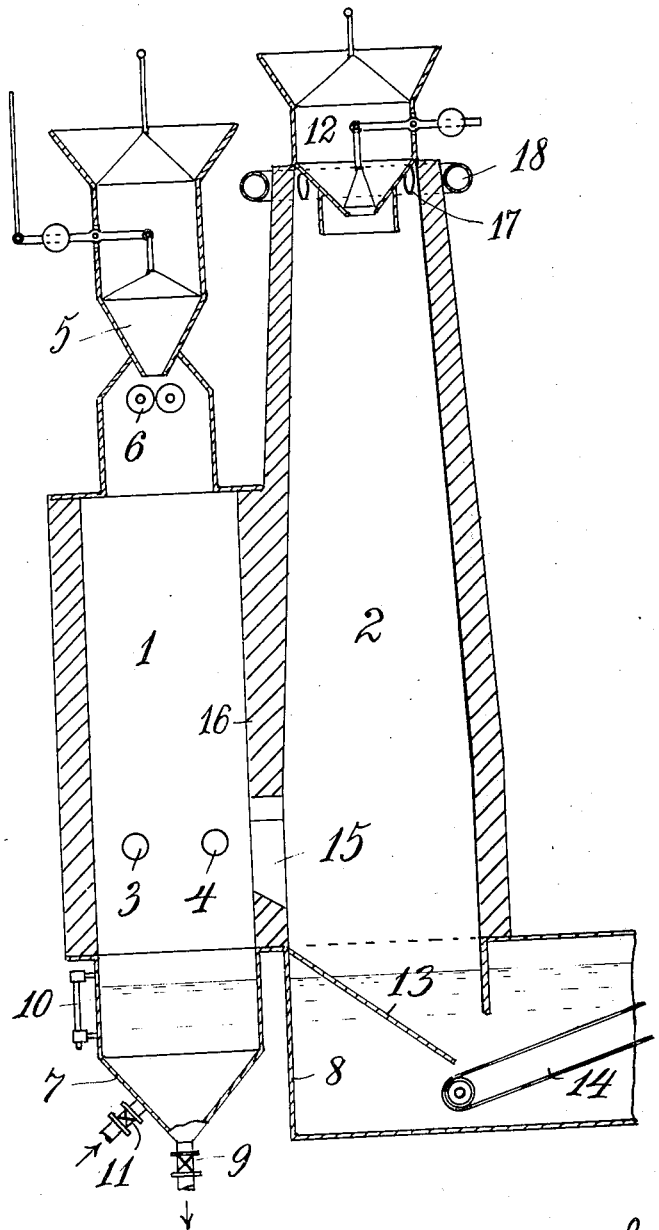
Inventor.
Jens M. F. Soelberg,
By Henry Orth Jr. atty.

Patented Sept. 18, 1934

1,974,125

UNITED STATES PATENT OFFICE 1,974,125

PROCESS FOR GENERATING GASEOUS FUELS

Jens Mörk Friis Soelberg, Oslo, Norway

Application January 12, 1931, Serial No. 508,356

4 Claims. (Cl. 48—206)

This invention relates to the production of combustible gas from solid carbonaceous materials and has for its object a process as well as an apparatus for generating gas by the aid of electric heating means to supply the heat required in the process.

As compared with known processes of generating gas by the aid of electric heating an important feature of the present invention consists therein that carbonaceous material is subjected to electrical heating in a chamber above a water surface so arranged as to be subjected to radiated heat from the electrical heating means.

The carbonaceous material reacts with the evolved water vapor forming hot gaseous reaction products, such as hydrogen, hydrocarbons, carbon monoxide and carbon dioxide and the so obtained gas is thereupon brought into contact with further quantities of carbonaceous material so as to effect coking of the same or to react with the constituents thereof.

The apparatus employed for carrying the invention into effect consists of at least two separate generator sections, a primary and a secondary section, which are so arranged as to allow of being charged with carbonaceous materials of different character, the primary section serving for example for treating low-grade materials such as sawdust, peat, chips, coke dust, charcoal powder, soot-ash etc., while the other section may be charged with more high grade material, such as coarse coal or coke.

An apparatus constructed in accordance with the invention is illustrated by way of example in the accompanying drawing, which represents a diagrammatic vertical sectional view of the generator.

In the illustrated example the generator comprises two sections 1 and 2, each provided with charging arrangements at the top. In the lower part of chamber 1 are arranged electric arc electrodes 3 and 4, which serve to maintain the desired temperature in this chamber. Below the charging hopper 5 is placed a grinding apparatus in which the gradually introduced material is ground to a fine powder before it is allowed to descend in the chamber. The bottom part of both generator sections consists of vessels 7, 8 containing water in controllable quantity. The vessel 7 has an ash discharge valve at 9, a gage glass at 10 and a pipe for supply of water at 11. In the vessel 8 at the bottom of chamber 2 is arranged a conveyor 14 for removing coke from chamber 2. A sloping plate 13 causes the material to be led on to the conveyor. Low grade carbonaceous fuel is gradually introduced into the generator chamber 1 through the disintegrator 6 and falls freely down through the chamber.

The atmosphere in this chamber is maintained at a sufficiently high temperature to cause decomposition of the coal and dissociation of part of the water vapor and to bring about reaction with the water vapor in the atmosphere. The gaseous decomposition products pass into the generator chamber 2 through the opening 15 in the wall 16. The chamber 2 contains a stationary charge of for example coal, which becomes heated by the hot gas entering from chamber 1. The gases on their passage through the chamber 2 become mixed with the gas resulting from the dry distillation of the coal and escape through pipes 17, 18 at the top of the shaft.

The chamber 2 may be charged with coke instead of coal, and in this instant gasification of the coke may be effected by reaction with water vapor and gaseous carbon compounds entering from the chamber 1. The percentage of water vapor in the gases from 1 may be controlled by regulating the level of liquid in vessel 7, by controlling the quantity of material introduced at 6 and by adjusting the supply of electrical energy.

The chamber 1 may be charged with low-grade or high-grade materials, or with fuels of any character separately or mixed as desired in each instance.

Instead of one primary and one secondary generator-chamber a greater or less number of generators of each type may be combined. The chambers are suitably so arranged in relation to one another as to avoid losses of heat to the greatest possible extent.

As a matter of course the walls of the generator-chamber 1 must be made sufficiently strong and tight to withstand the pressure necessary to force the gases into and through the charge in chamber 2. The charging arrangement must of course also be of gastight construction.

I claim:

1. Process for producing combustible gas comprising subjecting the free surface of a body of water in a substantially closed zone to radiant heat of an electric arc located above the water surface to produce water vapor, subjecting the water vapor so produced to the dissociating influence of the electric arc to dissociate said vapor, passing finely divided carbonaceous material in attenuated condition through the dissociation zone of the electric arc in the presence of the dissociated water vapor and withdrawing the hot gaseous products through a body of solid carbonaceous material in another zone to carbonize said material.

2. Process for generating combustible gases which comprises dropping finely divided solid carbonaceous fuel through an electric arc zone in the presence of water vapor, maintaining an atmosphere of water vapor by evaporation from a body of liquid water exposed to the radiant heat from said arc zone, said body of water receiving the residues from said fuel.

3. Process according to claim 1 and constantly withdrawing from the arc zone gaseous products produced therein, and passing said products through a stack of solid carbonaceous fuel closely adjacent the arc zone to carbonize said fuel, said fuel being heated solely by heat from the electric arc zone.

4. Process for generating combustible gases which comprises introducing free finely disintegrated solid carbonaceous fuel into an electric arc zone in the presence of water vapor, maintaining the water vapor in the arc zone by evaporation from a body of liquid water the free surface of which is exposed to the radiant heat from the arc zone, constantly withdrawing hot gaseous reaction products from the arc zone, and passing said products through a stack of solid carbonaceous fuel adjacent the arc zone to carbonize said fuel.

JENS MÖRK FRIIS SOELBERG.